US00RE40777E

(19) United States
(12) Reissued Patent
Jarbot et al.

(10) Patent Number: US RE40,777 E
(45) Date of Reissued Patent: Jun. 23, 2009

(54) AIR INTERFACE FOR TELECOMMUNICATIONS SYSTEMS WITH CORDLESS TELECOMMUNICATIONS BETWEEN MOBILE AND/OR STATIONARY TRANSMITTING RECEIVING DEVICES

(75) Inventors: Lutz Jarbot, Berlin (DE); Holger Landenberger, Bocholt (DE); Albrecht Kunz, Saarbruecken (DE); Markus Nasshan, Erding (DE)

(73) Assignee: Nokia Siemens Networks GmbH & Co. KG, Munich (DE)

(21) Appl. No.: 11/150,605

(22) PCT Filed: Jun. 30, 1999

(86) PCT No.: PCT/DE99/01909
§ 371 (c)(1),
(2), (4) Date: Dec. 29, 2000

(87) PCT Pub. No.: WO00/02401
PCT Pub. Date: Jan. 13, 2000

Related U.S. Patent Documents

Reissue of:
(64) Patent No.: 6,816,507
Issued: Nov. 9, 2004
Appl. No.: 09/720,697
Filed: Dec. 29, 2000

(30) Foreign Application Priority Data

Jun. 30, 1998 (DE) ..... 198 29 196

(51) Int. Cl.
*H04J 3/16* (2006.01)
*H04J 3/12* (2006.01)
*H04B 7/216* (2006.01)

(52) U.S. Cl. ..... 370/465; 370/335; 370/342; 370/441; 370/442; 370/468; 370/469; 370/479; 370/498; 370/522; 370/524; 370/538

(58) Field of Classification Search ..... 370/465, 370/524, 441–442, 468, 469, 479, 498, 522, 370/538, 335, 342, 328, 347, 310; 375/130, 375/231

See application file for complete search history.

(56) References Cited

U.S. PATENT DOCUMENTS 5,479,444 A * 12/1995 Malkamaki et al. ..... 375/231

(Continued)

FOREIGN PATENT DOCUMENTS

EP 615352 A1 * 9/1994
EP 627827 A2 * 12/1994

OTHER PUBLICATIONS

Urie et al., "An Advanced TDMA Mobile Access System for UMTS", IEEE PErsonal Communication, Feb. 1995, pp. 38–47.*

(Continued)

*Primary Examiner*—Steven H. D. Nguyen
*Assistant Examiner*—Nittaya Juntima
(74) *Attorney, Agent, or Firm*—Laurence A. Greenberg; Werner H. Stemer; Ralph E. Locher

(57) ABSTRACT

In order to improve the performance of physical channels in telecommunications systems using wire-free telecommunication between mobile and/or stationary transmitting/receiving appliances as a function of; the channel data transmission rate, the system environment, the system utilization and the distance between the transmitting/receiving appliances, such that no circuitry changes are required to the transmitters and/or receivers in the transmitting/receiving appliances, an air interface is proposed, in which the number of $N_{PILOT}$ bits, $N_{TPC}$ bits and $N_{TFC1}$ bits are each variable, and in which, in particular during an active or passive telecommunications link between the mobile and/or stationary transmitting/receiving appliances in the telecommunications system, the number of $N_{PILOT}$ bits, $N_{TPC}$ bits and $N_{TFC1}$ bits can each be varied and/or optimized adaptively by control means, such as by suitable "layer 2" or "layer 3" signaling ("layer 2/3" signaling) which takes place, for example, via the DPDCH channel.

20 Claims, 7 Drawing Sheets

U.S. PATENT DOCUMENTS

| | | | | | |
|---|---|---|---|---|---|
| 5,490,136 | A | * | 2/1996 | Sereno et al. | 370/342 |
| 5,606,580 | A | * | 2/1997 | Mourot et al. | 375/340 |
| 6,009,091 | A | * | 12/1999 | Stewart et al. | 370/342 |
| 6,363,058 | B1 | * | 3/2002 | Roobol et al. | 370/310 |
| 6,381,229 | B1 | * | 4/2002 | Narvinger et al. | 370/328 |
| 6,542,484 | B1 | * | 4/2003 | Ovesjo et al. | 370/335 |
| 6,603,773 | B2 | * | 8/2003 | Laakso et al. | 370/441 |
| 6,606,314 | B1 | * | 8/2003 | Bahrenburg et al. | 370/347 |

OTHER PUBLICATIONS

Andermo et al., "A CDMA–Based Access Design for UMTS," IEEE Personal Communication, Feb. 1995, pp. 48–53.*

Jung et al., "Konzept eines CDMA–Mobilfunksystems mit gemeinsamer Detektion fur die dritte Mibilfunkgeneration, Teil 1," Nachrichtentechnik Elekronik, Berlin 45, 1995, pp. 10–14, 24–27.*

Nachrichtentechnik Eletronik 42, Jan./Feb. 1992, No. 1, Berlin, DE; U. Pilger "Struktur des DECT–Standards," pp. 23–29.*

ETSI–Publication, Oct. 1992, ETS 300175 1–6, Part 1: Overview, pp. 1–30; Part 2: Physical layer pp. 1–39; Part 3; Medium access control layer, pp. 1–197; Part 4: Data link control layer, pp. 1–128; Part 5: Network layer, pp. 1–241; Part 6: Identities and addressing, pp. 1–41.*

ETSI–Publication, Oct. 1992, ETS 300175 7–9 Part 7: Security features, pp. 1–104; Part 8: Speech coding and transmission, pp. 1–39, Part 9: Public access profile, pp. 1–71.*

Dect–Publikation des DECT–Forums, Feb. 1997, pp. 1–16.*

Informatik Spektrum, Jun. 14, 1991, No. 3, Berlin, A. Mann, "Des GSM–standard—Grundlage fur digitale europaische Mobilfunknetze," pp. 137–152.*

Telekon praxis Apr. 1993, P. Smolka "GSM–Funkschnittstelle–Elemente und Funktionen," pp. 17–24.*

Funkschau 6/98: R. Sietmann Ringen um die UMTS–Schnittstelle, pp. 76–81.*

IEEE Communications Magazine, Jan. 1995, pp. 50–57, Falconer et al., Time Division Multiple Access Methods for Wireless Personal Communications.*

Baier et al., "CDMA–ein gunstiges Vielfachzugriffs–verfahren fur frequenzselektive und zeitvariante Mobilfunkkanale," Nachrichtentechnik Elektronik, Berlin 41, 1991, pp. 223–227 and 234.*

Baier et al., "CDMA Myths and Realities Revisited," IEICE Transactions on Fundamentals of Electronics, Communications and Computer Sciences, pp. 1930–1937.*

Baier, "Spread–Spectrum–Technik und CDMA," Telekom praxis, pp. 9–14.*

Dr. Zimmermann, "Anwendung von CDMA (Code Division Multiple Access) in der Mobilkommunikation," ITG Fachberichte 124, 1993, pp. 67–75.*

Dr. T. Ketseoglou et al, "Effizienter Teilnehmerzugriff fur 3. Generation der Mobilkommunikation," Telcom Report 16, 1993, pp. 38–41.*

ETSI STC SMG2 UMTS–L1, Ultra Physical Layer Description FDD parts (V0.3, May 29, 1998).*

TSG RAN WG1 (S1.21) V0.0.0 Jan. 1999.*

* cited by examiner

AIR INTERFACE FOR TELECOMMUNICATIONS SYSTEMS WITH CORDLESS TELECOMMUNICATIONS BETWEEN MOBILE AND/OR STATIONARY TRANSMITTING RECEIVING DEVICES

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention pertains to wireless telecommunication systems and in particular to an air interface for telecommunications systems using wireless telecommunication between mobile and/or stationary transmitting/receiving units.

2. Description of the Related Art

Telecommunications systems using wireless telecommunication between mobile and/or stationary transmitting/receiving units (appliances) are specific message systems using a message transmission path between a message source and a message sink, and in which, for example, base transceiver stations and mobile units are used as transmitting and receiving appliances for message processing and transmission and in which, 1) the message processing and message transmission can take place in a preferred transmission direction (simplex mode) or in both transmission directions (duplex mode),
2) the message processing is preferably digital,
3) the message transmission takes place over the long-distance transmission path without wires on the basis of various message transmission methods for multiple use of the message transmission path FDMA (Frequency Division Multiple Access), TDMA (Time Division Multiple Access) and/or CDMA (Code Division Multiple Access)—for example in accordance with radio standards such as DECT [Digital Enhanced (previously: European) Cordless Telecommunication; see Nachrichtentechnik Elektronik 42 (1992) [Information Technology Electronics 42 (1992)] Jan./Feb. No. 1, Berlin, DE; U. Pilger "Struktur des DECT-Standards" [Structure of the DECT Standard], pages 23 to 29 in conjunction with the ESTI publication ETS 300175-1 . . . 9; Oct. 1992 and the DECT publication from the DECT Forum, February 1997, pages 1 to 16], GSM [Groupe Spéciale Mobile or Global System for Mobile Communication; see Informatik Spektrum 14 [Information Spectrum 14] (1991) June, No. 3, Berlin, DE; A. Mann: "Der GSM-Standard—Grundlage für digitale europäische Mobilfunknetze" [The GSM Standard—basis for digital European mobile radio networks], pages 137 to 152 in conjunction with the publication telekom praxis [Telecom Practice] 4/1993, P. Smolka "GSM-Funkschnittstellel—Elemente und Funktionen" [GSM air interface—elements and functions], pages 17 to 24], UMTS [Universal Mobile Telecommunication System; see (1): Nachrichtentechnik Elektronik [Information Technology Electronics], Berlin 45, 1995, Issue 1, pages 10 to 14 and Issue 2, pages 24 to 27; P. Jung, B. Steiner: "Konzept eines CDMA-Mobilfunksystems mit gemeinsamer Detektion für die dritte Mobilfunkgeneration" [Concept of a CDMA mobile radio system with joint detection for the third mobile radio generation]; (2): Nachrichtentechnik Elektronik [Information Technology Electronics], Berlin 41, 1991, Issue 6, pages 223 to 227 and page 234; P. W. Baier, P. Jung, A. Klein: "CDMA—ein günstiges Vielfachzugriffsverfahren für frequenzselektive und zeitvariante Mobilfunkkanäle" [CDMA—a useful multiple access method for frequency-selective and time-variant mobile radio channels]; (3) IEICE Transactions on Fundamentals of Electronics, Communications and Computer Sciences, Vol. E79-A, No. 12, December 1996, pages 1930 to 1937; P. W. Baier, P. Jung: "CDMA Myths and Realities Revisited"; (4): IEEE Personal Communications, February 1995, pages 38 to 47; A. Urie, M. Streeton, C. Mourot: "An Advanced TDMA Mobile Access System for UMTS"; (5): telekom praxis [Telecom Practice], 5/1995, pages 9 to 14; P. W. Baier: "Spread-Spectrum-Technik und CDMA—eine ursprünglich militärische Technik erobert den zivilen Bereich" [Spread-spectrum technology and CDMA—an originally military technology conquers the civil area]; (6): IEEE Personal Communications, February 1995, pages 48 to 53; P. G. Andermo, L. M. Ewerbring: "A CDMA-Based Radio Access Design for UMTS"; (7): ITG Fachberichte 124 [ITG Specialist Reports] (1993), Berlin, Offenbach: VDE Verlag ISBN 3-8007-1965-7, pages 67 to 75; Dr. T. Zimmermann, Siemens A G: "Anwendung von CDMA in der Mobilkommunikation" [Use of CDMA in mobile communication]; (8); telcom report 16, (1993), Issue 1, pages 38 to 41; Dr. T. Ketseoglou, Siemens A G and Dr. T. Zimmermann, Siemens A G: "Effizienter Teilnehmerzugriff für die 3. Generation der Mobilkommunikation—Vielfachzugriffsverfahren CDMA macht Luftschnittstelle flexibler" [Efficient subscriber access for the 3rd generation of mobile communication—the CDMA multiple access method makes the air interface more flexible]; (9): Funkschau [Radio Show] 6/98: R. Sietmann "Ringen um die UMTS-Schnittstelle" [Ring around the UMTS interface], pages 76 to 81] WACS or PACS, IS-54, IS-95, PHS, PDC, etc. [see IEEE Communications Magazine, January 1995, pages 50 to 57; D. D. Falconer et al.: "Time Division Multiple Access Methods for Wireless Personal Communications"].

"Message" is a generic term, which covers both the information and the physical representation (signal). Despite a message having the same information, different signal forms may occur. Thus, for example, a message relating to a subject may be transmitted (1) in the form of a picture,
(2) as a spoken word,
(3) as a written word,
(4) as an encrypted word or picture The types of transmission in categories (1) through (3) are in this case normally characterized by continuous (analog) signals, while the type of transmission in category (4) normally comprises discontinuous signals (for example pulses, digital signals).

According, for example, to the document Funkschau [Radio Show] 6/98: R. Sietmann "Ringen um die UMTS-Schnittstelle" [Ring around the UMTS interface], pages 76 to 81 there are two scenario elements in the UMTS scenario (3rd mobile radio generation or IMT-2000). In a first scenario element, the licensed coordinated mobile radio is based on a WCDMA technology (Wideband Code Division Multiple Access) and, as in the case of GSM, is operated using the FDD mode (Frequency Division Duplex), while, in a second scenario element, the unlicensed uncoordinated mobile radio is based on a TD-CDMA technology (Time Division-Code Division Multiple Access) and, as in the case of DECT, is operated using the TDD mode (Frequency Division Duplex).

For WCDMA/FDD operation of the universal mobile telecommunications system, the air interface of the telecommunications system in each case contains a number of physical channels in the uplink and downlink telecommunications directions in accordance with the document ETSI STC SMG2 UMTS-L1, Tdoc SMG2 UMTS-L1 163/98: "UTRA Physical Layer Description FDD Parts" Vers. 0.3, May 29, 1998 of which a first physical channel, the so-called Dedicated Physical Control CHannel DPCCH and a second physical channel, the so-called Dedicated Physical Data CHannel DPDCH, [lacuna] with respect to a "three-layer structure" composed of 720 ms long ($T_{MZR}$=720 ms) super frames MZR, 10 ms long ($T_{FZR}$=10 ms) time frames (radio frames) ZR and 0.625 ms long ($T_{ZS}$=0.625 ms) time slots ZS, which are illustrated in FIGS. 1 and 2. Each super frame MZR contains, for example, 72 time frames ZR, while each time frame ZR in turn has, for example, 16 time slots ZS1 . . . ZS16. As a burst structure for the first physical channel DPCCH, the individual time slot ZS, ZS1 . . . ZS16 (burst) has a pilot sequence PS with a number $N_{PILOT}$ of bits ($N_{PILOT}$ bits) for channel estimation, a TPC sequence TPCS with a number $N_{TPC}$ of bits ($N_{TPC}$ bits), in particular for rapid power control (Traffic Power Control), and a TFCI sequence TFCIS with a number $N_{TFC1}$ of bits ($N_{TFC1}$ bits) for traffic format channel indication, which indicate the bit rate, the type of service, the type of error protection coding, etc., and, for the second physical channel DPDCH, has a user data sequence NDS with a number $N_{DATA}$ of user data bits ($N_{DATA}$ bits). Table 1, below, contains the bit values specified in table 3.2.2-4 by the ARIB in the ARIB publication "Specifications of Air-Interface for a 3G Mobile System", Volume 3, June 1998 for the DPDCH channel and the DPCCH channel with the bit subdivisions $N_{PILOT}$, $N_{TPC}$, $N_{TFC1}$ for channel bit rates of 64 and 128 kbit/s, respectively.

| Channel bit rate (kbps) | Channel symbol rate (ksps) | Spread factor | Bits/frame DPDCH | Bits/frame DPCCH | Bits/frame Total | Bits/time slot | Bits/time slot DPDCH | Bits/time slot DPCCH $N_{TFC1}$ | Bits/time slot DPCCH $N_{TPC}$ | Bits/time slot DPCCH $N_{PILOT}$ |
|---|---|---|---|---|---|---|---|---|---|---|
| 64 | 32 | 128 | 480 | 160 | 640 | 40 | 30 | 0 | 2 | 8 |
| 64 | 32 | 128 | 448 | 192 | 640 | 40 | 28 | 2 | 2 | 8 |
| 128 | 64 | 64 | 1120 | 160 | 1280 | 80 | 70 | 0 | 2 | 8 |
| 128 | 64 | 64 | 1088 | 192 | 1280 | 80 | 68 | 2 | 2 | 8 |

In the "downlink" (downward telecommunications direction; radio link from the base transceiver station to the mobile station) in the WCDMA/FDD system from ESTI and ARIB—FIG. 1—the first physical channel ["Dedicated Physical Control Channel (DPCCH)] and the second physical channel ["Dedicated Physical Data Channel (DPDCH)] are time-division multiplexed while, in the "uplink" (upward telecommunications direction; radio link from the mobile station to the base transceiver station)—FIG. 2—I/Q multiplexing is used, in which the second physical channel DPDCH is transmitted in the I channel, and the first physical channel DPCCH is transmitted in the Q channel.

For TDCDMA/TDD operation of the universal mobile telecommunications system, the air interface of the telecommunications system in the uplink and downlink telecommunications directions is once again based, in accordance with the document TSG RAN WG1 (S1.21): "3$^{rd}$ Generation Partnership Project (3GPP)" Vers. 0.0.1, 1999–01, on the "three-layer structure" consisting of the super frames MZR, the time frames ZR and the time slots ZS, for all the physical channels, which is illustrated in FIG. 3. Each super frame MZR in turn contains, for example, 72 time frames, while each time frame ZR in turn has, for example, the 16 time slots ZS1 . . . ZS16. The individual time slot ZS, ZS1 . . . ZS16 (burst) has either, in accordance with the ARIB proposal, a first time slot structure (burst structure) ZSS1 in the sequence comprising a first user data sequence NDS1 with $N_{DATA1}$ bits, the pilot sequence PS with $N_{PILOT}$ bits for channel estimation, the TPC sequence TPCS with $N_{TPC}$ bits for power control, the TFCI sequence TFCIS with $N_{TFC1}$ bits for traffic format channel indication, a second user data sequence NDS2 with $N_{DATA2}$ bits and a guard period SZZ with $N_{GUARD}$ bits or, in accordance with the ETSI proposal, a second time slot structure (burst structure) ZSS2 in the sequence comprising the first user data sequence NDS1, a first TFCI sequence TFCIS1, a midamble sequence MIS for channel estimation, a second TFCI sequence TFCIS2, the second user data sequence NDS2 and the guard period SZZ.

FIG. 4 shows, for example, on the basis of a GSM radio scenario having, for example, two radio cells and base transceiver stations arranged in them, with a first base transceiver station BTS1 (transmitter/receiver) omnidirectionally illuminating a first radio cell FZ1, and a second base transceiver station BTS2 (transmitting/receiving appliance) omnidirectionally illuminating a second radio cell FZ2 and, based on FIGS. 1 and 2, a radio scenario with multiple channel utilization using frequency/time/code-division multiplexing, in which the base transceiver stations BTS1, BTS2 are connected or can be connected via an air interface designed for the radio scenario to a number of mobile stations MS1 through MS5 (transmitting/receiving units) located in the radio cells FZ1, FZ2 by wire-free unidirectional or bidirectional—uplink direction UL and/or downlink direction DL—telecommunication to corresponding transmission channels TRC. The base transceiver stations BTS1, BTS2 are connected in a known manner (see GSM telecommunications system) to a base transceiver station controller BSC, which carries out the frequency administration and switching functions in order to control the base transceiver stations. For its part, the base transceiver station controller BSC is connected via a mobile switching center MSC to the higher-level telecommunications network, for example to the PSTN (Public Switched Telecommunication Network) The mobile switching center MSC is the administration center for the described telecommunications system. It carries out all call administration and, using attached registers (not shown), carries out the authentication of telecommunications subscribers as well as location monitoring in the network.

FIG. 5 shows the basic design of the base transceiver station BTS1, BTS2, which is in the form of a transmitting/receiving appliance, while FIG. 6 shows the basic design of the mobile station MS1 through MS5, which is likewise in the form of a transmitting/receiving appliance. The base transceiver station BTS1, BTS2 transmits and receive radio messages from and to the mobile station MS1 through MS5, while the mobile station MS1 . . . MS5 transmits and receives radio messages from and to the base transceiver station BTS1, BTS2. For this purpose, the base transceiver station has a transmitting antenna SAN and a receiving antenna EAN, while the mobile station MS1 through MS5 has an antenna ANT which is used for both transmitting and receiving and can be controlled by an antenna switching circuit AU. In the uplink direction (reception path), the base transceiver station BTS1, BTS2 receives (via the receiving antenna EAN), for example, at least one radio message FN with a frequency/time/code component of at least one of the mobile stations MS1 through MS5, while, in the downlink direction (reception path), the mobile station MS1 through MS5 receives (via the common antenna ANT), for example at least one radio message FN with a frequency/time/code component of at least one base transceiver station BTS1, BTS2. The radio message FN in this case comprises a carrier signal spread over a broad bandwidth and with information composed of data symbols modulated onto it.

A radio receiving device FEE (receiver) is used to filter the received carrier signal and to mix it down to an intermediate frequency which, for its part, is subsequently sampled and digitized. After analog/digital conversion, the signal, which has been subject to distortion by multipath propagation on the radio path, is fed to an equalizer EQL, which compensates for the majority of the distortion (keyword: synchronization).

A channel estimator KS then attempts to estimate the transmission characteristics of the transmission channel TRC on which the radio message FN has been transmitted. The transmission characteristics of the channel are in this case indicated by means of the channel impulse response in the time domain. To make it possible to estimate the channel impulse response, the radio message FN is allocated or assigned, at the transmitting end (in the present case by the mobile station MS1 through MS5 or the base transceiver station BTS1, BTS2), a specific additional information item, which is constructed as a training information sequence and is in the form of a so-called midamble.

A data detector DD, which is downstream from this and is common to all the received signals, is used to equalize and separate the individual mobile-station-specific signal elements contained in the common signal, in a known manner. After equalization and separation, the data symbols which have been present up to this point are converted in a symbol-to-data converter SDW into binary data. After this, a demodulator DMOD is used to obtain the original bit stream from the intermediate frequency before, in a demultiplexer DMUX, the individual time slots are allocated to the correct logical channels, and thus also to the various mobile stations.

The received bit sequence is decoded channel-by-channel in a channel codec KC. Depending on the channel, the bit information is assigned to the monitoring and signaling time slot or to a voice time slot and—in the case of the base transceiver station (FIG. 5)—the monitoring and signaling data and the voice data for transmission to the base transceiver station controller BSC are jointly transferred to an interface SS which is responsible for signaling and voice coding/decoding (voice codec), while—in the case of the mobile station (FIG. 6)—the monitoring and signaling data are transferred to a control and signaling unit STSE, which is preferably in the form of a microprocessor μP and is responsible for all the mobile station signaling and control, and the voice data are transferred to a voice codec SPC which is designed for voice inputting and outputting. The microprocessor μP contains a program module PGM which is designed on the basis of the ISO layer model [see: Unterrichtsblatter [Training sheets]—Deutsche Telekom, Year 48, 2/1995, pages 102 to 111] and in which the air interface protocol for the UMTS scenario is handled. Of the layers defined in the layer model, only the first four layers, which are essential for the mobile station, are shown; a first layer S1, a second layer S2, a third layer S3 and a fourth layer S4, with the first layer S1 containing, inter alia, the DPCCH channel and the DPDCH channel.

In the voice codec of the interface SS in the base transceiver station BTS1, BTS2, the voice data in a predetermined data stream become [lacuna] (for example 64 kbit/s stream in the network direction, and a 13 kbit/s stream from the network direction).

The base transceiver station BTS1, BTS2 is controlled entirely in a control unit STE, which is preferably in the form of a microprocessor μP. The microprocessor μP once again contains the program module PGM which is designed on the basis of the ISO layer model [see: Unterrichtsbl atter—Deutsche Telekom, Year 48, 2/1995, pages 102 to 111] and in which the air interface protocol for the UMTS scenario is handled. Of the layers defined in the layer model, once again only the first four layers, which are essential for the base transceiver station, are shown; the first layer S1, the second layer S2, the third layer S3 and the fourth layer S4, with the first layer S1 containing, inter alia, the DPCCH channel and the DPDCH channel.

In the downlink direction (transmission path), the base transceiver station BTS1, BTS2 transmits (via the transmitting antenna SAN), for example, at least one radio message FN with a frequency/time/code component to at least one of the mobile station MS1 through MS5, while, in the uplink direction (transmission path), the mobile station MS1 through MS5 transmits (via the common antenna ANT), for example, at least one radio message FN with a frequency/time/code component to at least one base transceiver station BTS1, BTS2.

In the base transceiver station BTS1, BTS2 in FIG. 5, the transmission path thus starts in such a way that monitoring and signaling data which are received from the base transceiver station controller BSC via the interface SS, together with voice data, are assigned in the channel codec KC to a monitoring and signaling time slot or to a voice time slot, respectively, and these are coded channel-by-channel into a bit sequence.

In the mobile station MS1 through MS5 in FIG. 6, the transmission path starts in such a way that voice data received from the voice codec SPC and monitoring and signaling data received from the control and signaling unit STSE are assigned, in the channel codec KC, to a monitoring and signaling time slot or to a voice time slot, respectively, and these are coded channel-by-channel into a bit sequence.

The bit sequence obtained in the base transceiver on BTS1, BTS2 and in the mobile station MS1 through MS5 is converted into data symbols in in each case one data-to-symbol converter DSW. Subsequently, the data symbols are in each case spread in a spreading device SPE using a respectively subscriber-specific code. After this, in the burst generator BG which comprises a burst compiler BZS and a multiplexer MUX, a training information sequence in the form of a midamble is added to each of the spread data symbols in the burst compiler BZS, for channel estimation, and the burst information obtained in this way is placed in the correct time slot in the multiplexer MUX. Finally, the burst that has been obtained is in each case radio-frequency-modulated modulated in a modulator MOD and is digital/analog converted before the signal obtained in this way is transmitted as a radio message FN via a radio transmitting device FSE (transmitter) to the transmitting antenna SAN or to the joint antenna ANT.

TDD telecommunications systems (Time Division Duplex) are telecommunications systems in which the transmission time frame, comprising a number of time slots, is split—preferably in the center—for the downlink transmission direction and the uplink transmission direction.

One TDD telecommunications system which has such a transmission time frame is, for example, the known DECT system (Digital Enhanced (previously: European) Cordless [Information Technology Electronics] 42 (1992) Jan./Feb. No. 1, Berlin, DE; U. Pilger "Struktur des DECT-Standards" [Structure of the DECT Standard], pages 23 to 29 in conjunction with the ESTI publication ETS 300175-1 . . . 9, October 1992 and the DECT publication from the DECT Forum, February 1997, pages 1 to 16]. The DECT system has a DECT transmission time frame with a time duration of 10 ms, consisting of 12 downlink time slots and 12 uplink time slots. For any given bidirectional telecommunications link at a given frequency in the downlink transmission direction DL and in the uplink transmission direction UL, a free time slot pair with a downlink time slot and an uplink time slot is chosen, in accordance with the DECT Standard, in which the separation between the downlink time slot and the uplink time slot, likewise in accordance with the DECT Standard, is half the length (5 ms) of the DECT transmission time frame.

FDD telecommunications system (Frequency Division Duplex) are telecommunications systems in which the time frame, comprising a number of time slots, for the downlink transmission direction is transmitted in a first frequency band, and that for the uplink transmission direction is transmitted in a second frequency band.

One FDD telecommunications system which transmits the time frame in this way is, for example, the known GSM system [Groupe Spéciale Mobile or Global System for Mobile Communications; see Informatik Spektrum [Information Spectrum] 14 (1991) June, No. 3, Berlin, DE; A. Mann: "Der GSM-Standard—Grundlage für digitale europäische Mobilfunknetze" [The GSM Standard—basis for digital European mobile radio networks], pages 137 to 152 in conjunction with the publication telekom praxis [Telecom Practice] 4/1993, P. Smolka "GSM-Funkschnittstelle—Elemente und Funktionen" [GSM radio interface—elements and functions], pages 17 to 24].

The air interface for the GSM system knows a large number of logical channels, which are referred to as bearer services, for example an AGCH channel (Access Grant CHannel), a BCCH channel (BroadCast CHannel), an FACCH channel (Fast Associated Control CHannel), a PCH channel (Paging CHannel), an RACH channel (Random Access CHannel) and a TCH channel (Traffic CHannel), whose respective function in the air interface is described, for example, in the document Informatik Spektrum [Information Spectrum] 14 (1991) June, No. 3, Berlin DE; A. Mann: "Der GSM-Standard—Grundlage für digitale europäische Mobilfunknetze" [The GSM Standard—basis for digital European mobile radio networks], pages 137 to 152 in conjunction with the publication telekom praxis [Telecom Practice] 4/1993, P. Smolka "GSM-Funkschnittstelle—Elemente und Funktionen" [GSM radio interface—elements and functions], pages 17 to 24.

Since, in particular, WCDMA/FDD operation and TDCDMA/TDD operation are intended to be used jointly for the purposes of the UMTS scenario (3rd mobile radio generation or IMT-2000), good telecommunications system performance is desirable in both the downlink direction and the uplink direction, that is to say a good bit error rate as a function of the signal-to-noise ratio.

The performance in the downlink and uplink directions is dependent, inter alia, on the channel estimation, rapid power control and detection of the format bits.

The quality of channel estimation, the functionality of rapid power control and the detection of the format bits are dependent on the numbers $N_{PILOT}$, $N_{TPC}$ and $N_{TFC1}$ and the energy in the respectively available bits.

The performance in the downlink and uplink directions may therefore be less than optimum for a chosen value triple $N_{PILOT}$, $N_{TPC}$ and $N_{TFC1}$.

If, for example, the number of $N_{PILOT}$ bits is too low, then too little energy is available for channel estimation. This causes "poor" channel estimation and/or a worse (higher) bit error rate in the receiver, that is to say the performance in the downlink and uplink directions is worse. A similar situation applies to $N_{TPC}$ bits for rapid power control and the $N_{TFC1}$ bits for traffic format channel indication.

The optimum value triple is dependent on the channel bit rate, the environment (city area, rural area, hilly area, in-house), the distance between the mobile station and the base transceiver station, the load level on the WCDMA/FDD system (number of active links, disturbance by interference from adjacent cells, etc.).

Normally, the value triple $N_{PILOT}$, $N_{TPC}$ and $N_{TFC1}$ is fixed for a specific channel bit rate and cannot be varied during a link or during the handover to a different area.

According to the document ETSI STC SMG2 UMTS-L1, Tdoc SMG2 UMTS-L1 168/98: "Flexible Power Allocation for Downlink DPCCH Fields", June 15–17, 1998, Turin, Italy, the pilot bits, the bits for rapid power control and the format bits are transmitted by the base transceiver station at a higher power level than the data bits in the DPDCH. A disadvantage in this case is that the AGC and the A/D converter for the data bits in the DPDCH channel are no longer operated at an optimum level in the receiving appliance. A further disadvantage is that the radio section in the transmitting appliance must be designed for a step-function increase/decrease in the transmitted power level. Advantageously, the number of data bits in the DPDCH channel does not change.

EP-0627827 A2 discloses a method for controlling the transmission of information streams at a variable rate in radio systems, in which available bits are allocated dynamically to the variable-rate information streams which originate from different sources in the system and which are transmitted on the same radio channel related to the same communication link, taking account of a number of system characteristics and system parameters.

BRIEF DESCRIPTION OF THE DRAWINGS

In the following FIGS. 1 to 7.

DETAILED DESCRIPTION OF THE PREFERRED EMBODIMENTS

Figure 1:
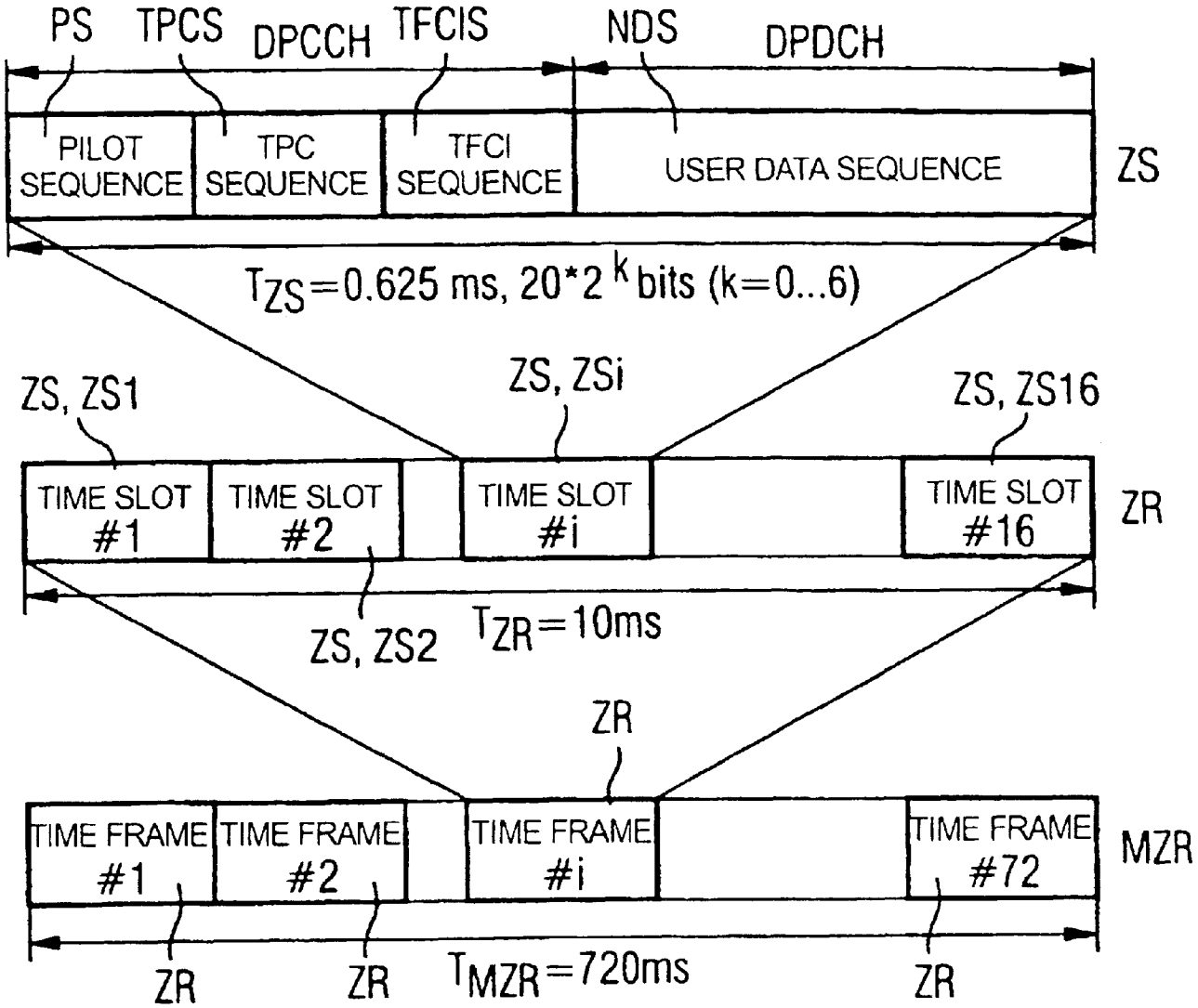
FIG. 1 shows a "three-layer structure" of a WCDMA/FDD air interface in the "downlink"
Figure 2:
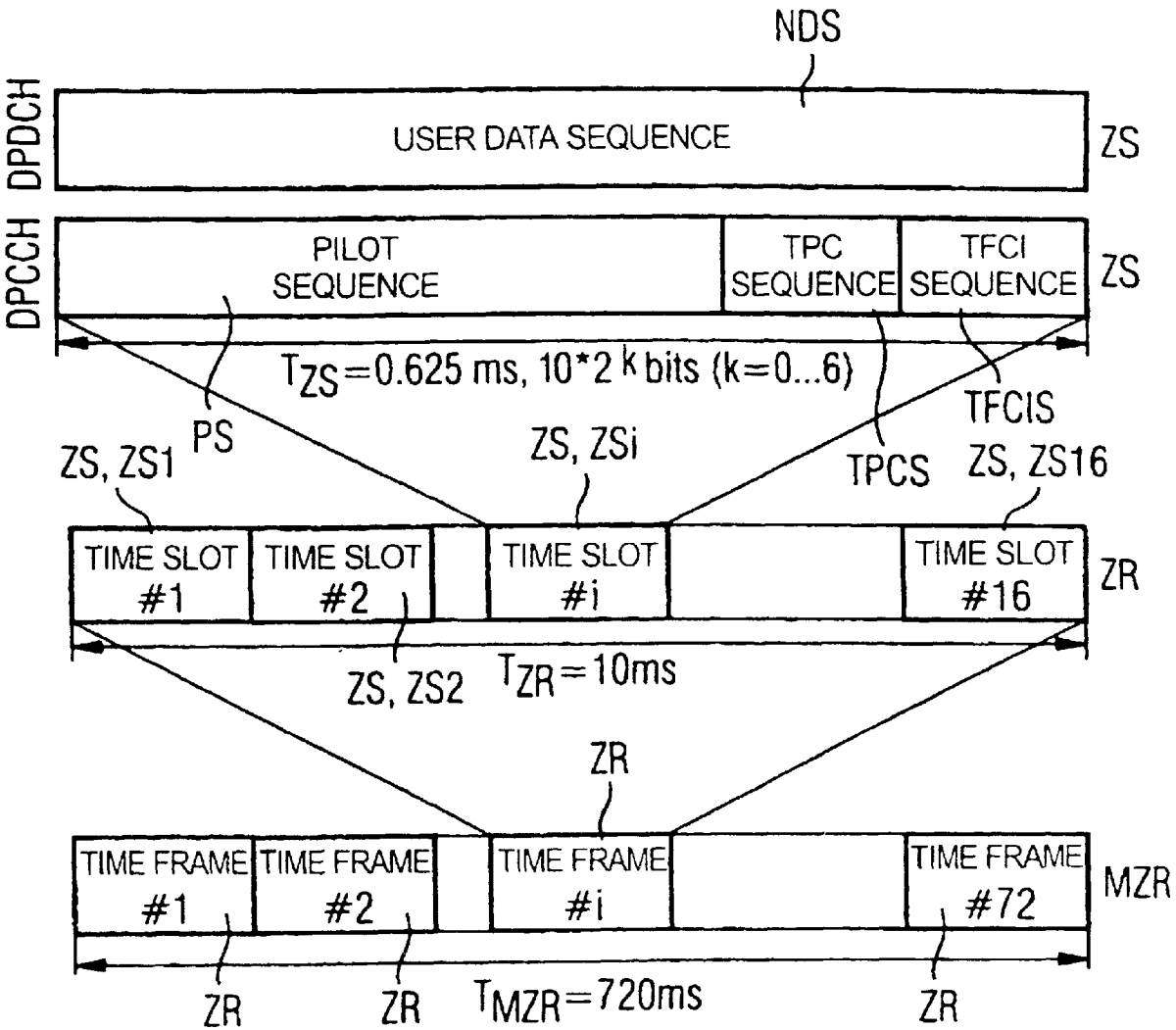
FIG. 2 shows a "three-layer structure" of a WCDMA/FDD air interface in the "uplink"
Figure 3:
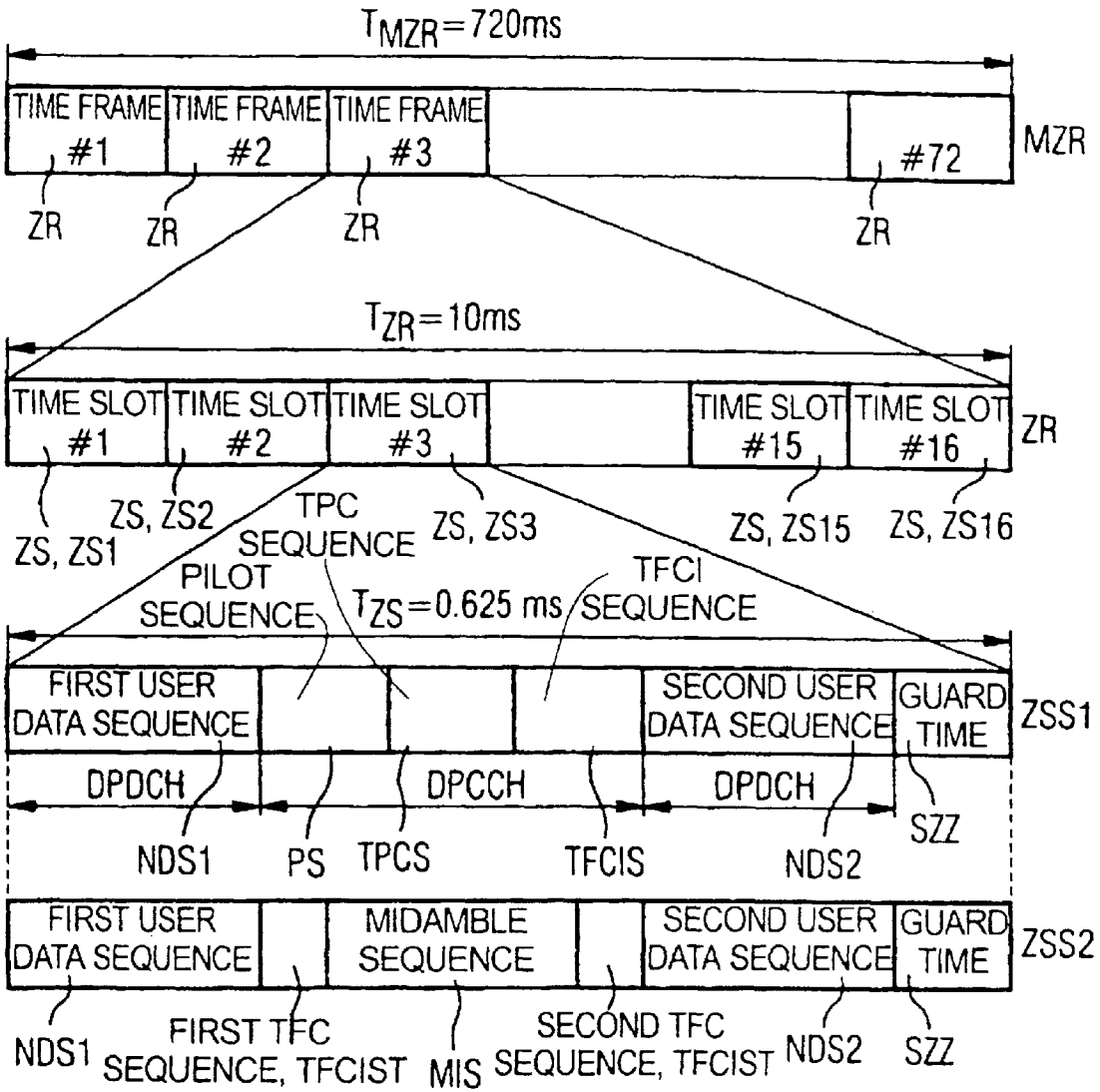
FIG. 3 shows a "three-layer structure" of a TDCDMA/TDD air interface.
Figure 4:
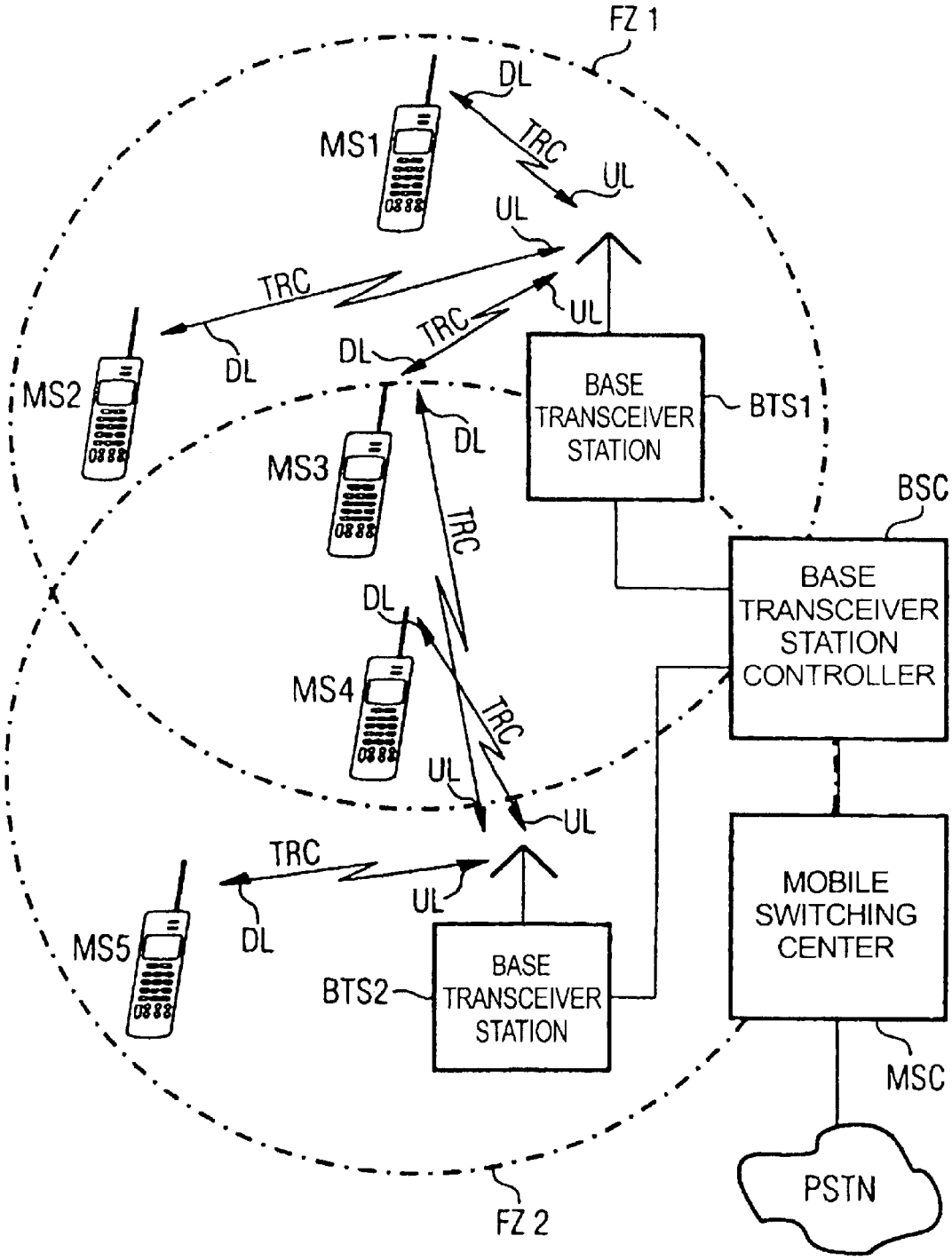
FIG. 4 shows a radio scenario with channel multiple use based on frequency/time/code division multiplex.

The object on which the invention is based is to improve the performance of physical channels in 35 telecommunications systems using wire-free telecommunication between mobile and/or stationary transmitting/receiving appliances, as a function of the channel data transmission rate, the system environment, the system load level and the distance between the transmitting/receiving appliances, such that no circuitry changes are required to the transmitter and/or receiver in the transmitting/receiving appliances.

This object is in each case achieved by an air interface having a physical first layer (S1) of the air interface (PGM) that contains a first physical channel (DPCCH) and a second physical channel (DPDCH) in at least one time slot (ZS) of a time frame structure (ZR, MZR) of the telecommunications system for each telecommunications link which is allocated to the first layer (S1). The first channel (DPCCH) contains a first data field for channel estimation (PS)—using channel estimation data ($N_{PILOT}$)—, a second data field for power control (TPCS)—using power control data ($N_{TPC}$)—and a third data field for traffic format channel indication (TFCIS)—using traffic format channel indication data ($N_{TFC1}$). Furthermore, the second channel (DPDCH) contains a user data field (NDS) with user data ($N_{DATA}$, $N_{DATA1}$, $N_{DATA2}$) A second layer (S2) which is responsible for data security and/or a third layer (S3) which is responsible for switching, of the air interface (PGM) each contain control means (STM) which are designed to access the physical channels (DPCCH, DPDCH) such that the distribution of the data ($N_{PILOT}$, $N_{TPC}$/$N_{TFC1}$) in the data fields (PS, TPCS, TFCIS) during the telecommunications link can be varied in the uplink and/or downlink telecommunications directions, by adaptation to characteristics of the telecommunications link. This is done while the amount of data in the user data field (NDS) and the total amount of data per time slot (ZS) remain constant.

The present invention proposes an air interface in which the number of $N_{PILOT}$ bits, $N_{TPC}$ bits and $N_{TFC1}$ bits is in each case variable and in which, particularly while there is an active or passive telecommunications link between mobile and/or stationary transmitting/receiving appliances in the telecommunications system, the number of $N_{PILOT}$ bits, $N_{TPC}$ bits and $N_{TFC1}$ bits can in each case be varied and optimized adaptively by control means, for example by suitable "layer 2" or "layer 3" signaling ("layer 2/3" signaling) which takes place, for example, via the DPDCH channel.

The distribution of the data, of the $N_{PILOT}$ bits, $N_{TPC}$ bits and $N_{TFC1}$ bits, in the DPCCH channel can be varied by adaptation to characteristics of the telecommunications link, during the telecommunications link in the uplink and/or downlink telecommunications directions, with the amount of data in the DPDCH channel remaining constant and the amount of data per time slot remaining constant. The variation can in this case also be carried out to such an extent that at least one bit type of said bits temporarily (for example for the duration of the corresponding telecommunications link) does not occur in the DPCCH channel, that is to say the number of corresponding bits in the DPCCH channel is equal to zero. In another embodiment of the present invention, the distribution of the data, of the $N_{PILOT}$ bits, $N_{TPC}$ bits and $N_{TFC1}$ bits, in the DPCCH channel can be varied during the telecommunications link in the uplink and/or downlink telecommunications directions by increasing the total amount of data per time slot.

This increase can be achieved in an advantageous manner in that the total amount of data per time slot is increased by reducing the spread factor.

Furthermore, in another embodiment of the present invention, the distribution of the data, of the $N_{PILOT}$ bits, $N_{TPC}$ bits and $N_{TFC1}$ bits, in the DPCCH channel can be varied during the telecommunications link in the downlink telecommunications direction with the total amount of data per time slot remaining constant, in that some of the $N_{PILOT}$ bits, $N_{TPC}$ bits and $N_{TFC1}$ bits in the DPCCH channel are allocated to the DPDCH channel, or some of the user bits (user data) in the DPDCH channel are allocated to the DPCCH channel.

Accordingly it is possible to increase or to decrease the number of $N_{PILOT}$ bits, $N_{TPC}$ bits and $N_{TFC1}$ bits by omitting or adding user bits or user data in the DPDCH channel.

Other embodiments of the present invention are based on the general fundamental idea, of making use of the fact and the circumstance that, in accordance with International Application PCT/DE98/02894, estimated channel impulse responses are correlated with one another, with the extent of correlation itself being correlated with the relative movement (slow or fast) of the mobile transmitting/receiving appliance or of the mobile station—(during slow movement, there is a strong correlation between the estimated channel impulse responses, while during fast movement there is a weak correlation between the estimated channel impulse responses)—and can be detected by the stationary and/or the mobile transmitting/receiving appliance, in that, for example, channel impulse responses from previous time slots are estimated by the stationary and/or the mobile transmitting/receiving appliance.

The present invention offers the advantage that—when a mobile transmitting/receiving appliance (a mobile station) is moving very slowly at a speed of less than 3 km/h (for example a data terminal with remote e-mail access) and when the channel estimation can be considerably improved on the basis of the above general basic considerations—the number of $N_{Pilot}$ bits can be reduced without noticeably adversely affecting the quality of channel estimation. In this case, the number of $N_{TFC1}$ bits for traffic format channel indication and/or the number of $N_{TPC}$ bits for rapid power control can be increased. Overall, this improves the performance of the telecommunications system both in the downlink direction and in the uplink direction.

This offers the advantage that—when, taking account of the above general basic considerations, a mobile transmitting/receiving appliance (a mobile station) is moving very fast at a speed of more than 150 km/h and when the rapid power control can no longer compensate for the Rayleigh fading (rapid fading, essentially caused by the movement of the mobile station) and, in consequence, only the log normal fading can still be controlled (slow fading, essentially caused by shadowing effects), in which case the log normal fading can be controlled using a considerably lower bit rate than that for rapid power control—the $N_{TPC}$ bits, for example, for rapid power control are now transmitted only in every tenth time slot. The $N_{TPC}$ bits for rapid power control are omitted in the other time slots. Additional $N_{PILOT}$ bits for channel estimation and/or $N_{TFC1}$ bits for traffic format channel indication are then transmitted for this purpose.

Furthermore, the present invention offers the additional advantage that when a mobile transmitting/receiving appliance (a mobile station) is initially moving very slowly, the number of $N_{PILOT}$ bits, of $N_{TFC1}$ bits and of $N_{TPC}$ bits used in this development is in each case used initially and that when—the mobile transmitting/receiving appliance (the mobile station) starts to move faster and faster, the number of $N_{Pilot}$ bits, of $N_{TFC1}$ bits and of $N_{TPC}$ bits used in this development is in each case used once a predetermined speed, for example 100 km/h, has been exceeded.

Figure 7:
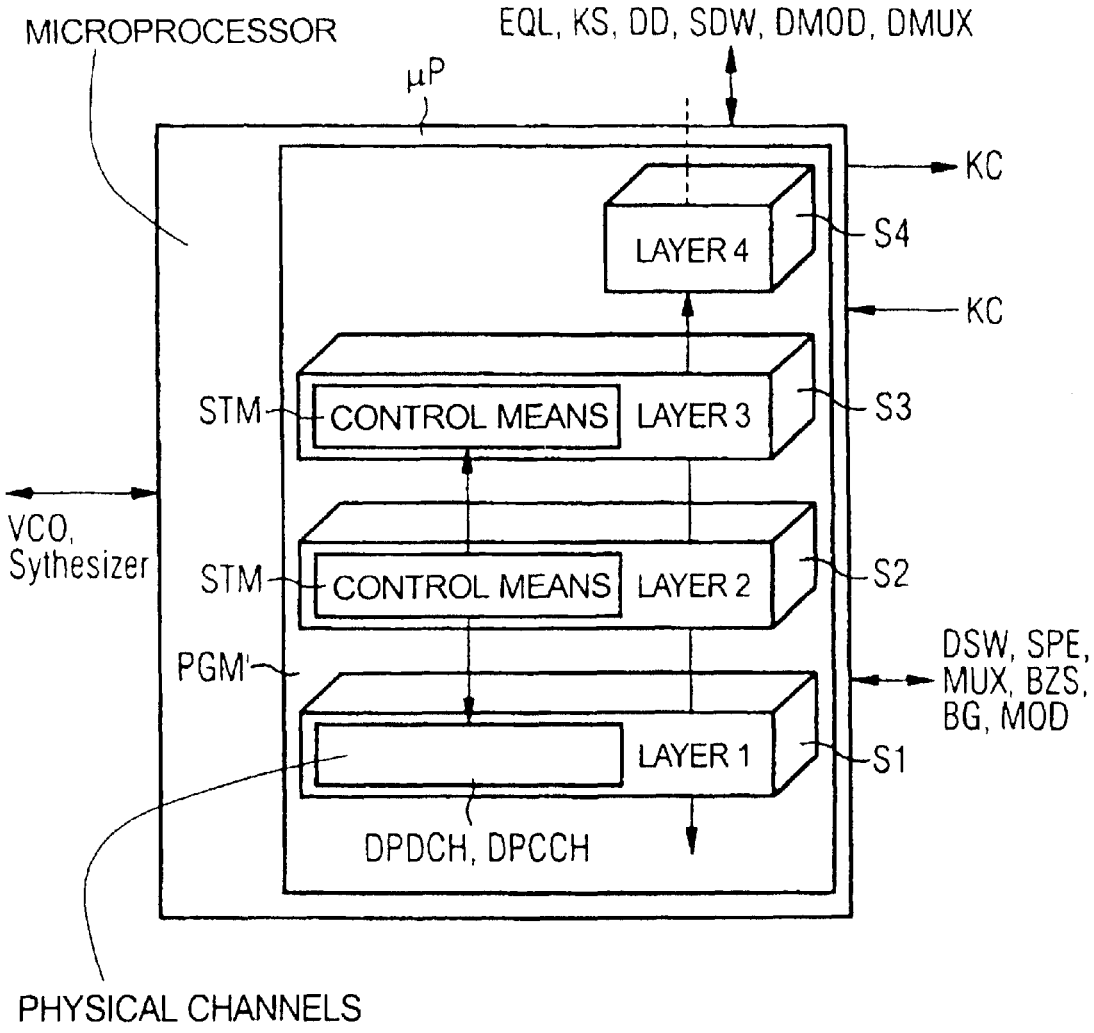
FIG. 7 shows a modified microprocessor, based on the microprocessor illustrated in FIGS. 5 and 6.

The inventions are explained using an exemplary embodiment and with reference to FIG. 7.

Figure 5:
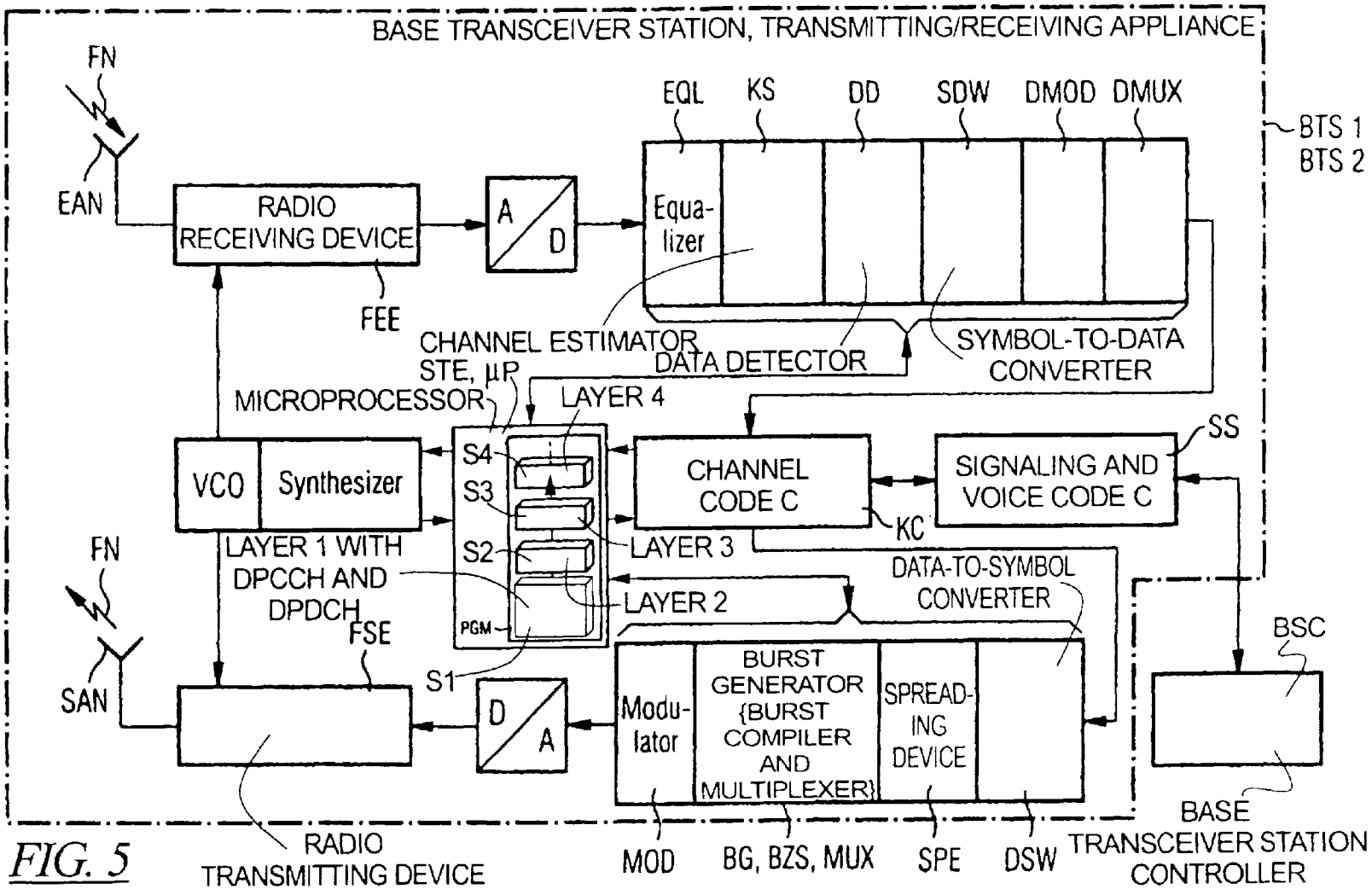
FIG. 5 shows the basic design of a base transceiver station in the form of a transmitting/receiving appliance.
Figure 6:
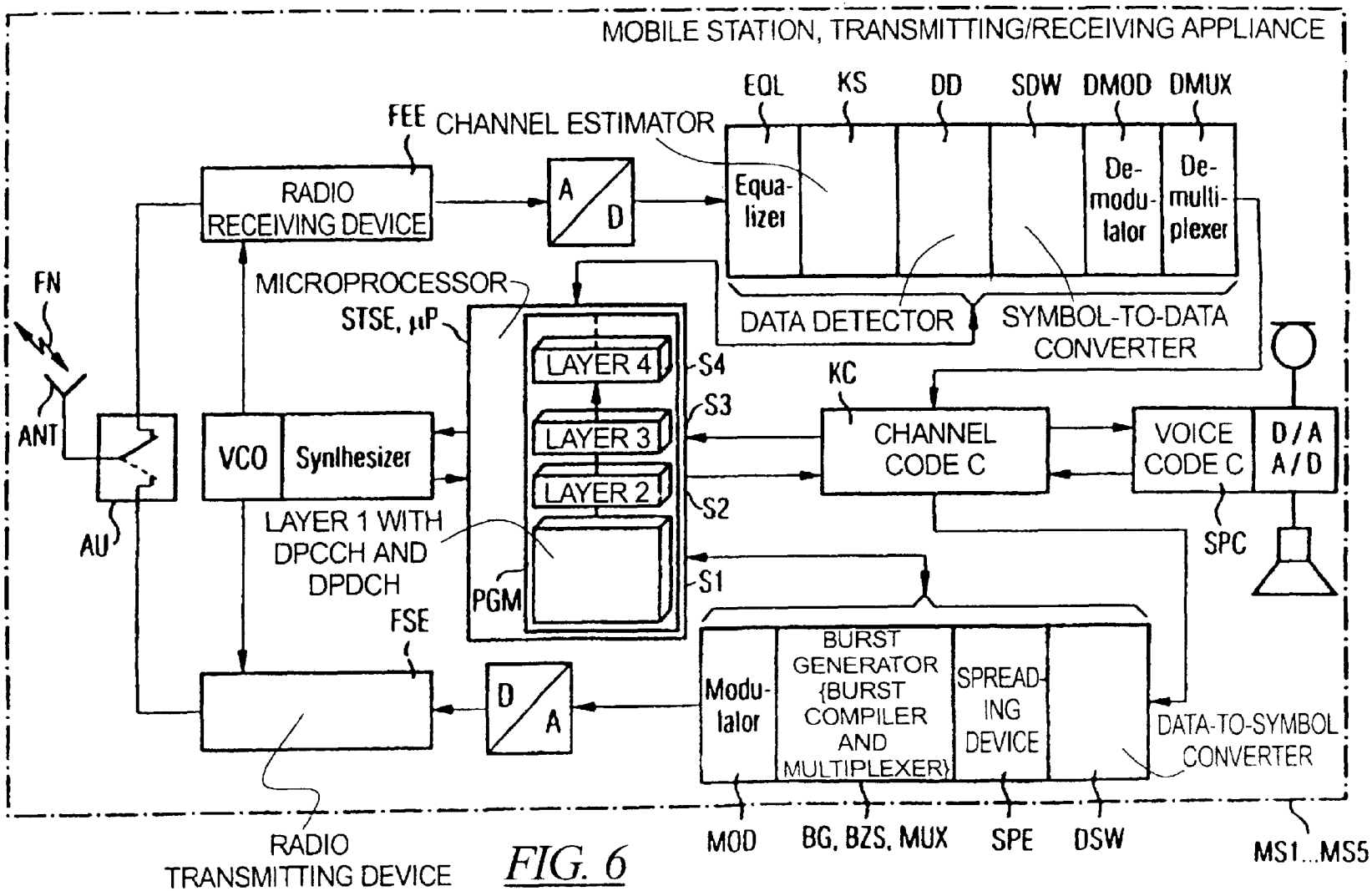
FIG. 6 shows the basic design of a mobile station, which is likewise in the form of a transmitting/receiving appliance.

That shows a modified microprocessor μP' with a modified program module PGM', based on the microprocessor μP illustrated in FIGS. 5 and 6. The modification consists in the modified program module PGM' in each case containing control means STM in the second layer S2 which is responsible for data security, and in the third layer S3 which is responsible for switching. These control means STM are designed in such a way and access the physical channels DPCCH, DPDCH in layer 1 in such a way that 1. the distribution of the $N_{PILOT}$ bits in the pilot sequence PS, of the $N_{TPC}$ bits in the TPC sequence TPCS and of the $N_{TFC1}$ bits in the TFCI sequence TFCIS during the telecommunications link in the uplink and/or downlink telecommunications directions can be varied by adaptation to characteristics of the telecommunications link, with the amount of data in the user data sequence NDS remaining constant, and with the total amount of data per time slot ZS remaining constant, and/or
2. the distribution of the $N_{PILOT}$ bits in the pilot sequence PS, of the $N_{TPC}$ bits in the TPC sequence TPCS and of the $N_{TFC1}$ bits in the TFCI sequence TFCIS during the telecommunications link in the uplink and/or downlink telecommunications directions can be varied by increasing the total amount of data per time slot ZS, and/or
3. the distribution of the $N_{PILOT}$ bits in the pilot sequence PS, of the $N_{TPC}$ bits in the TPC sequence TPCS and of the $N_{TFC1}$ bits in the TFCI sequence TFCIS during the telecommunications link in the uplink and/or downlink telecommunications directions can be varied, with the total amount of data per time slot ZS remaining constant, in that some of the $N_{PILOT}$ bits in the pilot sequence PS, of the $N_{TPC}$ bits in the TPC sequence TPCS and of the $N_{TFC1}$ bits in the TFCI sequence TFCIS are allocated to the DPDCH channel, or some of the $N_{DATA}$ bits, of the $N_{DATA1}$ bits and of the $N_{DATA}2$ bits in the user sequence NDS are allocated to the DPCCH channel.

Furthermore, it is possible for the control means STM to be designed in such a way and to access the physical channels DPCCH, DPDCH in layer 1 in such a way that 4. the number of $N_{PILOT}$ bits in the pilot sequence PS is reduced in favor of the number of $N_{TPC}$ bits in the TPC sequence TPCS and/or the number of $N_{TFC1}$ bits in the TFCI sequence TFCIS when, as a first characteristic of the telecommunications link, the mobile transmitting/receiving appliance MS1 through MS5 is moving at a slow speed of significantly less than 5 km/h, and/or
5. the number of $N_{TPC}$ bits in the TPC sequence TPCS is reduced in favor of the number of $N_{PILOT}$ bits in the pilot sequence PS and/or the number of $N_{TFC1}$ bits in the TFCI sequence TFCIS when, as a second characteristic of the telecommunications link, the mobile transmitting/receiving appliance MS1 . . . MS5 is moving at a high speed of significantly more than 100 km/h.

Although various minor changes and modifications might be proposed by those skilled in the art, it will be understood that our wish is to include within the claims of the patent warranted hereon all such changes and modifications as reasonably come within our contribution to the art.

We claim:

1. An air interface for telecommunications systems utilizing wireless telecommunication between at least one of stationary transmitting/receiving units and mobile transmitting/receiving units, comprising:

a physical first layer that includes at least one first physical channel and at least one second physical channel in at least one time slot, said at least one time slot being part of a time frame structure of the telecommunications system for each of a telecommunications link that is allocated to said physical first layer, said at least one first physical channel including a first data field for channel estimation utilizing channel estimation data, said at least one first physical channel further including a second data field for power control utilizing power control data, said at least one first physical channel further including a third data field for traffic format channel indication utilizing traffic format channel indication data, said at least one second physical channel includes a user data field with user data;

at least one of a second layer and a third layer, said second layer being responsible for data security, said third layer being responsible for switching;

a control in at least one of said second layer and said third layer that accesses the at least one first physical channel and the at least one second physical channel, said control controlling distribution of the channel estimation data and the power control data and the traffic format channel indication data among the first data field and the second data field and the third data field so as to be varied in at least one of an uplink and a downlink telecommunication direction, said distribution being adapted to the characteristics of said telecommunications link while amount of data in the user data field remains constant and a total amount of data per said at least one time slot also remains constant.

2. An air interface for telecommunications systems utilizing wireless telecommunication between at least one of stationary transmitting/receiving units and mobile transmitting/receiving units, comprising:

a physical first layer that includes at least one first physical channel and at least one second physical channel in at least one time slot, said at least one time slot being part of a time frame structure of the telecommunications system for each of a telecommunications link that is allocated to said physical first layer, said at least one first physical channel including a first data field for channel estimation utilizing channel estimation data, said at least one first physical channel further including a second data field for power control utilizing power control data, said at least one first physical channel further including a third data field for traffic format channel indication utilizing traffic format channel indication data, said at least one second physical channel includes a user data field with user data;

at least one of a second layer and a third layer, said second layer being responsible for data security, said third layer being responsible for switching;

a control in at least one of said second layer and said third layer that accesses the at least one first physical channel and the at least one second physical channel, said control controlling a distribution of the channel estimation data and the power control data and the traffic format channel indication data among the first data field and the second data field and the third data field so as to be varied in at least one of an uplink and a downlink telecommunication direction, with a total amount of data per time slot remaining constant, at least one of first data in data fields being allocated to the second channel and the user data in the user data field being allocated to the first channel, said first data including the power estimation data and the power control data and the traffic format channel indication data.

3. An air interface according to claim 2, wherein the control varies the distribution by reducing number of data in the first data field in favor of at least one of data items in the second data field and the third data field provided that said at least one of mobile transmitting/receiving units is moving at a speed of substantially less than 5 kilometers per hour.

4. An air interface according to claim 3, wherein the control varies the distribution by reducing number of data in the second data field in favor of at least one of data items in the first data field and the third data field provided that said at least one of mobile transmitting/receiving units is moving at a speed of substantially more than 100 kilometers per hour.

5. An air interface according to claim 2, wherein the telecommunications system is being operated in at least one of a FDD mode and a TDD mode.

6. An air interface according to claim 2, wherein the telecommunications system is being operated in a broadband mode.

7. An air interface according to claim 2, wherein the control varies the distribution by increasing a total amount of data per the at least one time slot in at least one of an uplink and down link telecommunication directions.

8. An air interface according to claim 1, wherein the control varies the distribution with the total number of data per time slot remaining constant, at least one of first data in data fields being allocated to the second channel and the user data in the user data field being allocated to the first channel, said first data including the power estimation data and the power control data and the traffic format channel indication data.

*9. An air interface for wireless telecommunications systems between devices comprising:*

*a first layer including at least one first physical channel and at least one second physical channel, wherein at least one time slot of a time frame structure of the telecommunications system is allocated to the first layer for each telecommunications link, and wherein the second channel includes a user data field with user data;*

*a first data field, contained within a channel field for channel estimation using channel estimation data;*

*a second data field for power control using power control data;*

*a third data field for traffic format channel indication using traffic format channel indication data;*

*a second layer which is responsible for data security and/or a third layer which is responsible for switching of the air interface, each second and/or third layer containing control means that access the physical channels in such a way that a distribution of the data in the data fields during the telecommunications link can be varied adaptively in the uplink and/or downlink telecommunications directions.*

*10. The air interface as claimed in claim 9, wherein the control means accesses the physical channels in such a way that the distribution of the data is changed adaptively while the amount of data in the user data field remains the same and the total amount of data in each time slot remains the same.*

*11. The air interface as claimed in claim 10, wherein the control means accesses the physical channels in such a way that the distribution of the data is changed adaptively by adaptation to characteristics of the telecommunications link.*

*12. The air interface as claimed in claim 9, wherein the control means accesses the physical channels in such a way that the distribution of the data is changed adaptively by increasing the total amount of data in each time slot.*

*13. The air interface as claimed in claim 9, wherein the control means accesses the physical channels in such a way that the distribution of the data is changed adaptively with the total amount of data in each time slot remaining the same in that data in the data fields is allocated to the second channel, or data in the user data field is allocated to the first channel.*

*14. The air interface as claimed in claim 11, wherein the control means accesses the physical channels in such a way that a number of data items in the first data field is reduced in favor of the number of data items in the second data field and/or the third data field if, as a first characteristic of the telecommunications link, a mobile transmitting/receiving appliance is moving at a low speed of less than 5 km/h.*

*15. The air interface as claimed in claim 11, wherein the control means accesses the physical channels in such a way that a number of data items in the second data field is reduced in favor of the number of data items in the first data field and/or the third data field if, as a second characteristic of the telecommunications link, a mobile transmitting/receiving appliance is moving at a high speed of more than 100 km/h.*

*16. The air interface as claimed in claim 12, wherein the total amount of data per time slot in a telecommunications system based on code division multiplex can be increased by reducing a spread factor among time slots.*

*17. The air interface as claimed in claim 9, wherein the telecommunications system can be operated in the FDD and/or TDD mode.*

*18. The air interface as claimed in claims 9, wherein the telecommunications system can be operated in a broadband mode.*

*19. The air interface as claimed in claim 9, wherein the control means accesses the physical channels in such a way that the distribution of the data is varied by increasing the total amount of data per time slot.*

*20. The air interface as claimed in claim 9, wherein the control means accesses the physical channels in such a way that the distribution of the data is varied, with the total amount of data per time slot remaining constant, in that data in the data fields are allocated to the second channel, or data in the user data field are allocated to the first channel.*

* * * * *